US 11,364,891 B2

(12) United States Patent
Zimmermann

(10) Patent No.: US 11,364,891 B2
(45) Date of Patent: Jun. 21, 2022

(54) BRAKING SYSTEM FOR A MOTOR VEHICLE AND METHOD FOR OPERATING SAID BRAKING SYSTEM

(71) Applicant: Continental Teves AG & Co. oHG, Frankfurt am Main (DE)

(72) Inventor: Jochen Zimmermann, Oberwallmenach (DE)

(73) Assignee: Continental Teves AG & Co. oHG

(*) Notice: Subject to any disclaimer, the term of this patent is extended or adjusted under 35 U.S.C. 154(b) by 92 days.

(21) Appl. No.: 16/648,876

(22) PCT Filed: Sep. 12, 2018

(86) PCT No.: PCT/EP2018/074609
§ 371 (c)(1),
(2) Date: Mar. 19, 2020

(87) PCT Pub. No.: WO2019/057586
PCT Pub. Date: Mar. 28, 2019

(65) Prior Publication Data
US 2020/0276963 A1 Sep. 3, 2020

(30) Foreign Application Priority Data
Sep. 20, 2017 (DE) .................. 10 2017 216 617

(51) Int. Cl.
*B60T 13/74* (2006.01)
*B60T 13/68* (2006.01)
(Continued)

(52) U.S. Cl.
CPC .............. *B60T 13/686* (2013.01); *B60T 7/04* (2013.01); *B60T 13/662* (2013.01);
(Continued)

(58) Field of Classification Search
CPC ............. B60T 13/745; B60T 2270/402; B60T 2270/404; B60T 2270/414
See application file for complete search history.

(56) References Cited

U.S. PATENT DOCUMENTS 6,209,966 B1 4/2001 Mies
9,834,188 B2 12/2017 Feigel
(Continued)

FOREIGN PATENT DOCUMENTS

DE 102013217954 A1 3/2015
DE 102013223859 A1 5/2015
(Continued)

OTHER PUBLICATIONS

German Search Report for German Application No. 10 2017 216 617.7, with partial English translation, dated Sep. 4, 2018, 8 pages.
(Continued)

*Primary Examiner* — Bradley T King
(74) *Attorney, Agent, or Firm* — RatnerPrestia

(57) ABSTRACT

A brake system and method for a motor vehicle with at least four hydraulically actuatable wheel brakes, includes a first electrically controllable pressure source separably connects a first brake circuit supply line via a first isolating valve, a second electrically controllable pressure source separably connects a second brake circuit supply line via a second isolating valve, at least four electrically actuatable inlet valves, each assigned to one of the wheel brakes, the first and second brake circuit supply lines are each connected to two inlet valves, an electrically actuatable outlet valve per brake, an electrically actuatable circuit separation device, by which the first and the second brake circuit supply line are hydraulically separated and connected. First and second electronic devices actuate the first and second pressure sources, respectively. The first isolating valve actuates the
(Continued)

second electronic device and the second isolating valve actuates the first electronic device.

18 Claims, 1 Drawing Sheet

(51) Int. Cl.
  *B60T 7/04* (2006.01)
  *B60T 13/66* (2006.01)
  *B60T 17/22* (2006.01)
(52) U.S. Cl.
  CPC .......... *B60T 13/745* (2013.01); *B60T 17/221* (2013.01); *B60T 2270/413* (2013.01)

(56) References Cited

U.S. PATENT DOCUMENTS

| | | | | |
|---|---|---|---|---|
| 10,730,501 B2* | 8/2020 | Ganzel | ................ | B60T 13/686 |
| 11,066,055 B2* | 7/2021 | Besier | ................ | B60T 8/4077 |
| 2002/0050739 A1* | 5/2002 | Koepff | ................ | B60T 8/348 |
| | | | | 303/122.09 |
| 2014/0028083 A1* | 1/2014 | Gerdes | ................ | B60T 8/4077 |
| | | | | 303/6.01 |
| 2014/0225425 A1 | 8/2014 | Drumm et al. | | |
| 2016/0009263 A1* | 1/2016 | Feigel | ................ | B60T 8/321 |
| | | | | 303/15 |
| 2016/0009267 A1 | 1/2016 | Lesinski | | |
| 2016/0023644 A1* | 1/2016 | Feigel | ................ | B60T 13/147 |
| | | | | 303/3 |
| 2018/0334148 A1* | 11/2018 | Feigel | ................ | B60T 7/042 |
| 2019/0031165 A1 | 1/2019 | Besier et al. | | |
| 2019/0308601 A1* | 10/2019 | Maj | ................ | B60T 7/042 |
| 2019/0344769 A1 | 11/2019 | Zimmermann | | |
| 2021/0053540 A1* | 2/2021 | Besier | ................ | B60T 8/17 |

FOREIGN PATENT DOCUMENTS

| | | |
|---|---|---|
| DE | 102016203563 A1 | 9/2017 |
| DE | 102017222445 A1 | 7/2018 |
| WO | 9839189 A1 | 9/1998 |

OTHER PUBLICATIONS

International Search Report and Written Opinion for International Application PCT/EP2018/074609, dated Nov. 9, 2018, 8 pages.
Chinese Office Action for Chinese Application No. 201880061034.8, dated Sep. 3, 2021, with translation, 14 pages.

* cited by examiner

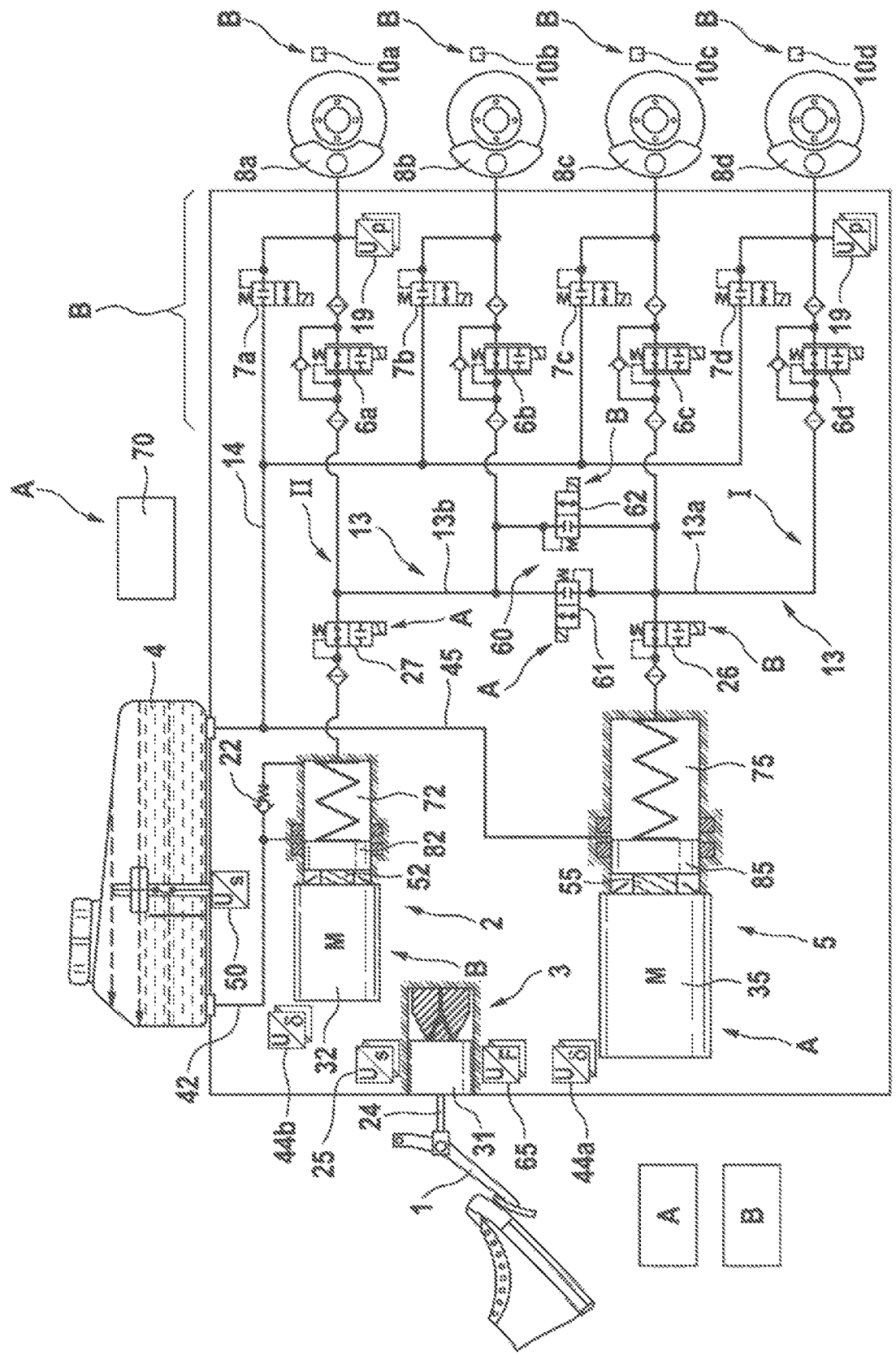

BRAKING SYSTEM FOR A MOTOR VEHICLE AND METHOD FOR OPERATING SAID BRAKING SYSTEM

CROSS REFERENCE TO RELATED APPLICATIONS

This application is the U.S. National Phase Application of PCT International Application No. PCT/EP2018/074609, filed Sep. 12, 2018, which claims priority to German Patent Application No. 10 2017 216 617.7, filed Sep. 20, 2017, the contents of such applications being incorporated by reference herein.

FIELD OF THE INVENTION

The invention relates to a brake system and to a method for operating such a brake system.

BACKGROUND OF THE INVENTION

A generic brake system with two electrically controllable pressure sources for a motor vehicle with four hydraulically actuatable wheel brakes is known from DE 10 2013 217 954 A1, incorporated by reference herein. Here, the wheel brakes, for actuation in various operating modes, are connected to the two electrically controllable pressure sources and also to a brake pedal-actuatable master brake cylinder. In addition to inlet and outlet valves, the brake system comprises a circuit separation valve and a total of four isolating valves for separating the master brake cylinder and the, furthermore, the brake system comprises a central control and regulating unit, a first control and regulating unit assigned to the first pressure source and a second control and regulating unit assigned to the second pressure source. The first and second control and regulating units each serve to control the corresponding pressure source. The circuit separation valve is actuated by means of the central control and regulating unit. The actuation of the two pressure source isolating valves is also carried out by means of the central control and regulating unit.

In future brake systems, which should also be suitable for highly automated driving, a mechanical and/or hydraulic fallback level, in which the driver can actuate the wheel brakes using muscle power, is intended to be dispensed with.

DE 10 2013 223 859 A1, incorporated by reference herein, discloses a brake system for hydraulically actuatable wheel brakes with a simulation device which can be actuated by means of a brake pedal, no mechanical and/or hydraulic operative connection between the brake pedal and the wheel brakes being provided. There is a single electrically controllable pressure source with a stepped piston and two sealing elements in order to achieve increased availability of the brake system.

SUMMARY OF THE INVENTION

An aspect of the present invention is a brake system suitable for highly automated driving for a motor vehicle with at least four hydraulically actuatable wheel brakes, which can do without a mechanical and/or hydraulic fallback level and yet still has a high level of availability and thus offers sufficient safety for highly automated driving or an autopilot function.

An aspect of the invention is based on the idea that in a brake system which has a first electrically controllable pressure source which is separably connected to a first brake circuit supply line via a first isolating valve, a second electrically controllable pressure source which is separably connected to a second brake circuit supply line via a second isolating valve, at least four electrically actuatable inlet valves, the first brake circuit supply line being connected to two of the inlet valves and the second brake circuit supply line being connected to the two other inlet valves, an electrically actuatable outlet valve per wheel brake for discharging pressure medium from the wheel brake, an electrically actuatable circuit separation device, by means of which the first brake circuit supply line and the second brake circuit supply line are hydraulically separated when the circuit separation device is in an unactuated state, and by means of which the first brake circuit supply line and the second brake circuit supply line are hydraulically connected to one another when the circuit separation device is in an actuated state, a first electronic device by means of which the first pressure source is actuated, and a second electronic device by means of which the second pressure source is actuated, the second electronic device being electrically independent of the first electronic device, there is provision that the first isolating valve assigned to the first pressure source is actuated by the second electronic device, and the second isolating valve assigned to the second pressure source is actuated by the first electronic device.

The two electronic devices are electrically independent of one another in the sense that a failure of the first electronic device does not cause a failure of the second electronic device and vice versa, that is to say the two electronic devices are electrically isolated. The first electronic device is therefore advantageously supplied by a first electrical energy supply, and the second electronic device is supplied by a second electrical energy supply, the first electrical energy supply being independent of the second electrical energy supply. The two electronic devices can be arranged in a common housing or on a common printed circuit board, for example in a common electronic control and regulating unit (ECU). Alternatively, the two electronic devices can be arranged in two separate housings or on two separate printed circuit boards, for example in two electronic control and regulating units (ECU).

The first electronic device is designed to actuate or control the first pressure source. The first pressure source is preferably also supplied with electrical energy by the first electronic device. Correspondingly, the second pressure source is actuated or controlled by means of the second electronic device. The second pressure source is preferably also supplied with electrical energy by the second electronic device.

The first isolating valve is preferably actuated only by the second electronic device, and the second isolating valve is actuated only by the first electronic device. That is to say that the first electronic device is not designed to actuate the first isolating valve, and the second electronic device is not designed to actuate the second isolating valve. Nor is there provided a further electronic device, for example a central electronic device, which actuates the first and the second isolating valve.

The first pressure source is preferably connected to the first brake circuit supply line via exactly one actuatable valve, namely the first isolating valve, that is to say no further actuatable valve is arranged between the first isolating valve and the two inlet valves connected to the first brake circuit supply line. The flow resistance from the pressure source to the corresponding wheel brakes is thus kept as low as possible.

Correspondingly, the second pressure source is preferably connected to the second brake circuit supply line via exactly one actuatable valve, namely the second isolating valve, that is to say no further actuatable valve is arranged between the second isolating valve and the two inlet valves connected to the second brake circuit supply line.

The first and the second isolating valve are preferably designed to be normally open. It is therefore not necessary to switch/open the isolating valves when the brake system is operating correctly, which prevents switching noises. A, for example defective, pressure source can be separated by closing the associated isolating valve by means of the electronic device assigned to the other pressure source.

The circuit separation device of the brake system is, so to speak, designed to be normally closed.

The circuit separation device can preferably be actuated both by means of the first electronic device and by means of the second electronic device, or the circuit separation device is actuated both by means of the first electronic device and by means of the second electronic device in order to hydraulically connect the first brake circuit supply line and the second brake circuit supply line to one another.

The circuit separation device preferably comprises a first electrically actuatable circuit separation valve, which is designed to be normally closed, and a second electrically actuatable circuit separation valve, which is designed to be normally closed, the two circuit separation valves being connected in parallel with one another. The first circuit separation valve is particularly preferably actuated by the first electronic device, and the second circuit separation valve is actuated by the second electronic device. The first circuit separation valve is advantageously actuated only by the first electronic device, and the second circuit separation valve is actuated only by the second electronic device, as a result of which the use of double-activatable valves is unnecessary.

The brake system preferably comprises a simulation device for generating a brake pedal feel, which is coupled to a brake pedal, no mechanical and/or hydraulic operative connection between the brake pedal and the wheel brakes being provided. The simulation device is therefore not hydraulically connected to the wheel brakes. The brake system also does not comprise a brake pedal-actuatable master brake cylinder that is connected to one of the wheel brakes.

The first pressure source is preferably formed by a (first) cylinder-piston arrangement with a (first) hydraulic pressure chamber, the (first) piston of which is actuated by a (first) electromechanical actuator, the (first) pressure chamber in an unactuated state of the (first) piston being connected via at least one first snifter hole to a first connecting line which is connected to the pressure medium reservoir. The first pressure source particularly preferably comprises exactly one (first) hydraulic pressure chamber, that is to say the first pressure source is constructed in a single circuit.

The second pressure source is preferably also formed by a (second) cylinder-piston arrangement with a (second) hydraulic pressure chamber, the (second) piston of which is actuated by an electromechanical second actuator (32, 52), the (second) pressure chamber in an unactuated state of the (second) piston being connected via at least one second snifter hole to a second connecting line which is connected to the pressure medium reservoir. The second pressure source particularly preferably comprises exactly one (second) hydraulic pressure chamber, that is to say the second pressure source is constructed in a single circuit.

According to a preferred development of an aspect of the invention, the inlet and outlet valves are all actuated by the same electronic device. All inlet and outlet valves are particularly preferably actuated only by the same electronic device.

A wheel speed sensor is preferably provided for each wheel assigned to a wheel brake, the signals from the wheel speed sensors being supplied to and evaluated by the same electronic device which actuates the inlet and outlet valves. In addition to building up pressure, wheel-specific slip control is thus also possible by means of this electronic device.

A driving dynamics sensor system is preferably provided, the signals from which are supplied to and evaluated by the electronic device other than the electronic device which actuates the inlet and outlet valves. In the event of a failure of the electronic device which actuates the inlet and outlet valves, in addition to central pressure control, axle-by-axle pressure control by means of the other electronic device is thus also possible (axle multiplex method). This enables the steerability (for example in the case of braked avoidance maneuvers by an autopilot) and the stability to be maintained.

The brake system preferably comprises a measuring device for detecting a pressure medium level of the pressure medium reservoir. The pressure medium reservoir is advantageously divided into two chambers by a partition, a first chamber being assigned to the first pressure source and a second chamber being assigned to the second pressure source. The measuring device is particularly preferably arranged in the first chamber.

An aspect of the invention offers the advantage that in the event that one of the electronic devices fails, the other electronic device can be used to build up brake pressure at all four wheel brakes, it also being possible to set different brake pressures at least axle by axle.

In the fault-free case of the brake system, the pressure is preferably provided at the wheel brakes by means of the first pressure source. The first pressure source is therefore preferably dimensioned to be stronger or larger than the second pressure source. The signals from the driving dynamics sensor system are particularly preferably supplied to and evaluated by the first electronic device (which is assigned to the first pressure source). The inlet and outlet valves are actuated by the second electronic device.

An aspect of the invention also relates to a method for operating a brake system according to an aspect of the invention.

In the event of a failure of the first pressure source, the first isolating valve is preferably closed by means of the second electronic device, and the second pressure source is actuated to build up a brake pressure.

Furthermore, in the event of a failure of the first pressure source, the circuit separation device is preferably actuated by means of the second electronic device, so that the first brake circuit supply line and the second brake circuit supply line are hydraulically connected to one another. In this way, pressure can be built up at the four wheel brakes by means of the second pressure source.

In the event of a failure of the first pressure source, the inlet and outlet valves are preferably actuated by means of the second electronic device in order to set wheel-specific brake pressures. This enables antilock or traction control functions of the brake system even if the first pressure source fails.

In the event of a failure of the second pressure source, the second isolating valve is preferably closed by means of the first electronic device, and the first pressure source is actuated to build up a brake pressure.

Furthermore, in the event of a failure of the second pressure source, the circuit separation device is preferably actuated by means of the first electronic device, so that the first brake circuit supply line and the second brake circuit supply line are hydraulically connected to one another. In this way, pressure can be built up and regulated at the four wheel brakes by means of the first pressure source.

In the event of a failure of the second pressure source, the first pressure source and the circuit separation device are preferably actuated by means of the first electronic device in order to set axle-specific brake pressures on the wheel brakes in accordance with an axle multiplex method.

BRIEF DESCRIPTION OF THE DRAWINGS

Further preferred embodiments of the invention will emerge from the dependent claims and the following description with reference to a FIGURE.

The FIGURE schematically shows an exemplary embodiment of a brake system according to the invention.

DETAILED DESCRIPTION OF THE PREFERRED EMBODIMENTS

In the FIGURE, an exemplary embodiment of a brake system according to the invention for a motor vehicle with four hydraulically actuatable wheel brakes 8a-8d is illustrated schematically. The brake system comprises a first electrically controllable pressure source 5, a second electrically controllable pressure source 2, a pressure medium reservoir 4 under atmospheric pressure and an inlet valve 6a-6d and an outlet valve 7a-7d for each wheel brake.

According to the example, the wheel brakes 8a and 8b are assigned to the wheels of one vehicle axle, and the wheel brakes 8c and 8d are assigned to the wheels of the other vehicle axle.

According to the example, it is a brake system without a mechanical and/or hydraulic operative connection between a brake pedal 1 and the wheel brakes 8a-8d. The brake system comprises a simulation device 3 which can be actuated by means of the brake pedal 1 and which provides the vehicle driver with a known brake pedal feel.

A brake supply line 13 is provided which connects the first and the second pressure sources 2, 5 to the inlet valves 6a-6d and thus to the wheel brakes 8a-8d. Here, the first pressure source 5 is connected to the brake supply line 13 via a first, preferably normally open, isolating valve 26, and the second pressure source 2 is connected to the brake supply line 13 via a second, preferably normally open, isolating valve 27. Arranged in the brake supply line 13 is an electrically actuatable circuit separation device 60, by means of which the brake supply line 13 can be hydraulically separated into a first brake circuit supply line 13a and a second brake circuit supply line 13b. The first electrically controllable pressure source 5 is separably connected to the first brake circuit supply line 13a via the first isolating valve 26, and the second electrically controllable pressure source 2 is separably connected to the second brake circuit supply line 13b via the second isolating valve 27.

The circuit separation device 60 is designed such that it hydraulically separates the first and the second brake circuit supply lines 13a, 13b when the circuit separation device is in an unactuated state. When the circuit separation device is in an actuated state, the first brake circuit supply line 13a and the second brake circuit supply line 13b are hydraulically connected to one another.

The first brake circuit supply line 13a is connected, according to the example, to the inlet valves 6c and 6d, and the second brake circuit supply line 13b is connected to the two other inlet valves 6a and 6b.

The circuit separation device 60 is thus arranged such that in a disconnected position of the circuit separation device 60, the brake supply line 13 is hydraulically separated into the first brake circuit supply line 13a and a second brake circuit supply line 13b, the first brake circuit supply line 13a connecting the first isolating valve 26 to the inlet valves 6c, 6d and the second brake circuit supply line 13b connecting the second isolating valve 27 to the two other inlet valves 6a, 6b.

Advantageously, the circuit separation device 60 is formed by a parallel connection of two electrically actuatable circuit separation valves 61, 62 which are designed to be normally closed.

The outlet valves 7a-7d are connected to the pressure medium reservoir 4 via a common return line 14, so that pressure medium can be discharged into the pressure medium reservoir 4 in order to reduce brake pressure in one or more wheel brakes.

The inlet valves 6a-6d are each connected in parallel with a check valve (not described in more detail) that opens toward the brake supply line 13.

The brake system comprises a first electronic device A and a second electronic device B, the second electronic device B being electrically independent of the first electronic device A. The electronic devices A, B are electrically isolated. In the event of a fault in the first electronic device A, for example due to an electrical defect, the second electronic device remains fully functional.

The electronic device A comprises electrical and/or electronic components for controlling and actuating the first pressure source 5 (indicated by the arrow with A in the FIGURE). Device A can be designed, for example, as a first electronic control and regulating unit (ECU) or as a first part of an electronic control and regulating unit. The electronic device A can comprise a first electrical energy source, by means of which the device A itself and the pressure source 5 are supplied with energy, or device A is connected to a first electrical energy source (for example a first vehicle electrical system). The first pressure source 5 can be supplied with energy directly from the first electrical energy source or from the device A (that is to say indirectly from the first electrical energy source).

The electronic device B comprises electrical and/or electronic components for controlling and actuating the second pressure source 2 (indicated by the arrow with B in the FIGURE). Device B can be designed, for example, as a second electronic control and regulating unit (ECU) or as a second part of an electronic control and regulating unit. The electronic device B can comprise a second electrical energy source, by means of which the device B itself and the pressure source 2 are supplied with energy, or device B is connected to a second electrical energy source (for example a second vehicle electrical system). In any case, for sufficient availability of the brake system, it is advantageous that the second electrical energy source is independent of the first energy source. The second pressure source 2 can be supplied with energy directly from the second electrical energy source or from the device B (that is to say indirectly from the second electrical energy source).

Simulation device 3 has, according to the example, a simulator piston 31 which is supported on a housing by an elastic element (for example a simulator spring) arranged in a simulator rear chamber. A piston rod 24 couples the pivoting movement of the brake pedal 1 as a result of a pedal actuation to the translational movement of the simulator piston 31, the actuation path of which is detected by a preferably redundantly designed displacement sensor 25. A force sensor 65 is preferably also provided, which detects the actuating force applied by the driver. The signals from the sensors 25, 65 represent a braking request by a vehicle driver.

The first electrically controllable pressure source 5 is designed as a hydraulic cylinder-piston arrangement (or a single-circuit electrohydraulic actuator (linear actuator)), the piston 85 of which is actuated by a schematically indicated electric motor 35 with the interposition of a rotation-translation gear 55, also shown schematically. A rotor position sensor 44a which serves to detect the rotor position of the electric motor 35 is provided.

The piston 85 delimits the pressure chamber 75 of the pressure supply device 5. Pressure chamber 75 is separably connected to the brake supply line 13 or the first brake circuit supply line 13a via the normally open isolating valve 26. When the circuit separation device 60 is actuated, pressure source 5 is connected via brake supply line 13 to the inlet valves 6a-6d (and thus the four wheel brakes 8a-8d); when the circuit separation device 60 is not actuated, pressure source 5 is connected via brake circuit supply line 13a to the inlet valves 6c and 6d (and thus the two wheel brakes 8c, 8d).

The pressure chamber 75 of the pressure source 5 is hydraulically connected (in the unactuated state of the piston 85) via a snifter hole to a connecting line 45 to the pressure medium reservoir 4, the snifter hole being run over/closed when the piston 85 is actuated, and the connection to the pressure medium reservoir 4 is thus separated.

The second electrically controllable pressure source 2 is also designed as a hydraulic cylinder-piston arrangement (or a single-circuit electrohydraulic actuator (linear actuator)), the piston 82 of which is actuated by a schematically indicated electric motor 32 with the interposition of a rotation-translation gear 52, also shown schematically. A rotor position sensor 44b which serves to detect the rotor position of the electric motor 35 is provided.

The piston 82 delimits the pressure chamber 72 of the pressure supply device 2. Pressure chamber 72 is separably connected to the brake supply line 13 or the second brake circuit supply line 13b via the normally open isolating valve 27. When the circuit separation device 60 is actuated, pressure source 2 is connected via brake supply line 13 to the inlet valves 6a-6d (and thus the four wheel brakes 8a-8d); when the circuit separation device 60 is not actuated, pressure source 2 is connected via brake circuit supply line 13b to the inlet valves 6a and 6b (and thus the two wheel brakes 8a, 8b).

The pressure chamber 72 of the pressure source 2 is hydraulically connected (in the unactuated state of the piston 82) via a snifter hole to a connecting line 42 to the pressure medium reservoir 4, the snifter hole being run over/closed when the piston 82 is actuated, and the connection to the pressure medium reservoir 4 is thus separated.

Regardless of the actuation state of the piston 82, the pressure chamber 72 is connected to the pressure medium reservoir 4 via a line with a check valve 22, which opens in the direction of the pressure chamber, so that pressure medium can be sucked into the pressure chamber 72 via this connection.

A restoring spring is arranged in the pressure chamber 75, 72 of the first and the second pressure source 5, 2, which spring resets the piston 85, 82 in its unactuated state.

When the circuit separation device 60 is closed, the brake system can be regarded as being divided into two partial brake circuits I and II. Here, in the first partial brake circuit I, the pressure source 5 is connected to only the wheel brakes 8c and 8d, and in the second partial brake circuit II the second pressure source 2 is connected to only the wheel brakes 8a and 8b. The brake system comprises a pressure sensor 19 for each partial brake circuit I and II. This sensor is preferably arranged in front of one of the wheel brakes of the partial brake circuit, according to the example the wheel brake 8a or 8d, that is to say between the inlet valve and the wheel brake.

According to the example, the brake system comprises a measuring device 50 for detecting a pressure medium level of the pressure medium reservoir 4 (level measuring device).

Each wheel of the motor vehicle is advantageously assigned a wheel speed sensor 10a-10d, which sensors are required, for example, for antilock control functions (ABS).

The brake system is also connected to or comprises a driving dynamics sensor system 70. The driving dynamics sensor system 70 comprises at least one measuring device for detecting one or more of the following variables:

- longitudinal acceleration, in particular vehicle longitudinal acceleration;
- lateral acceleration, in particular vehicle lateral acceleration;
- yaw rate;
- steering angle.

According to the example, the hydraulic or mechanical components, in particular the pressure sources 2, 5, the simulation device 3, the isolating valves 26, 27, the circuit separation device 60, the inlet and outlet valves 6a-6d, 7a-7d and sensors 19, are arranged in a common module, that is to say in a single hydraulic control and regulating unit (HCU). However, an arrangement in two or more modules is also possible.

As has already been explained, the first electronic device A is provided for actuating the first pressure source 5, and the independent second electronic device B is provided for actuating the second pressure source 2. However, the first isolating valve 26 assigned to the first pressure source 5 is actuated by the second electronic device B, and the second isolating valve 27 assigned to the second pressure source 2 is actuated by the first electronic device A. Furthermore, the circuit separation device 60 can be actuated both by means of the first electronic device A and by means of the second electronic device B, that is to say the hydraulic connection between the first brake circuit supply line 13a and the second brake circuit supply line 13b can be opened by means of the device A and the device B. According to the example, the first circuit separation valve 61 is actuated by the first electronic device A, and the second circuit separation valve 62 is actuated by the second electronic device B.

Alternatively, the circular separation device 60 can be formed by a single electrically actuatable circuit separation valve which is designed to be normally closed and which is actuated by means of the first electronic device A and the second electronic device B. For this purpose, the circuit separation valve can comprise, for example, two actuating coils, of which one coil is activated by the device A and the other coil is activated by the device B.

Advantageously, the inlet and outlet valves (wheel valves for short) 6a-6d, 7a-7d are all actuated by the same electronic device, according to the example by the device B of the second pressure source 2.

In the case of functional devices A and B, a brake pressure build-up is advantageously carried out by means of the devices A via the first pressure source 5, wherein wheel-specific brake pressures are set by means of the devices B via the wheel valves 6a-6d and 7a-7d. Alternatively, a brake pressure build-up can also be carried out by means of the devices B via the second pressure source 2. The circuit separation device 60 can here be opened by means of the device A or B. It is also possible, with the circuit separation device 60 closed, to supply the wheel brakes 6a, 6b with pressure by means of the devices B via the second pressure source 2 and to supply the wheel brakes 6c, 6d with pressure by means of the devices A via the first pressure source 5.

With regard to the maximum brake pressure that can be generated, the required pressure build-up dynamics and the maximum delivery volume, the first pressure source 5 is therefore preferably dimensioned to be stronger or larger than the second pressure source 2.

In the event of a fault or failure of the devices A or of the first pressure source 5, a brake pressure build-up is carried out by means of the device B via the second pressure source 2, with it being possible for the circuit separation device to be opened by means of the device B (by opening the circuit separation valve 62) in order to apply the pressure of the second pressure source 2 to all wheel brakes 8a-8d. A loss of pressure medium through the snifter hole of the failed pressure source 5 is avoided by closing the isolating valve 26 by means of the device B. Wheel-specific brake pressures can be set by means of the device B via the wheel valves 6a-6d and 7a-7d.

Advantageously, therefore, the signals from the wheel speed sensors 10a-10d are supplied to and evaluated by the electronic device B which actuates the wheel valves 6a-6d, 7a-7d in order to enable wheel-specific slip control by means of this electronic device B.

Correspondingly, in the event of a fault or failure of the devices B or the pressure source 2, a brake pressure build-up is carried out by means of the device A via the first pressure source 5, wherein the circuit separation device can be opened by means of the device A (by opening the circuit separation valve 61) in order to apply the pressure of the pressure source 5 to all wheel brakes 8a-8d. A loss of pressure medium through the snifter hole of the failed pressure source 2 is avoided by closing the isolating valve 27 by means of the device A.

The signals from the driving dynamics sensor system 70 are advantageously supplied to and evaluated by the electronic device A. Thus, to improve the driving stability or to support steering maneuvers of the autopilot, the device A can set, at least axle-specifically, different brake pressures by means of the pressure source 5 and the circuit separation valve 61 in the axle multiplex method (successive pressurization of the first partial brake circuit I (wheel brakes 8c, 8d) and of the second partial brake circuit II (wheel brakes 8a, 8b)).

An aspect of the invention proposes a redundant brake system for future motor vehicles, which is suitable for realizing highly automated driving functions and is especially capable of implementing autonomous braking requirements. Even after serious faults, such as for example a power failure of a (first) vehicle electrical system, the brake system is able to continue to perform certain residual braking functions autonomously or under control by autopilot.

The exemplary brake system fulfills the following important residual braking functions in particular:
building up deceleration;
adhering to the locking sequence of the axles and avoiding unwanted destabilization at higher decelerations;
maintaining steerability of the motor vehicle in order to enable the (auto) pilot also to perform braked avoidance maneuvers.

The exemplary brake system comprises two electrically controllable pressure sources, each with an isolating valve, a wheel pressure modulation group (inlet and outlet valves) and a circuit separation device. The brake system does not include a hydraulic fallback level, but a permanent hydraulic decoupling of the driver/brake pedal.

The exemplary brake system comprises a primary and a secondary pressure source 5, 2 in the form of a linear actuator and eight conventional wheel valves 6a-6d, 7a-7d (wheel control valves).

If one of the two pressure sources 5, 2 now fails due to a fault (for example due to a power failure of the vehicle electrical system), the respective other pressure source or the electronic device assigned to it can still brake all wheels by means of opening one of the two circuit separation valves 60, 61.

In order to avoid loss of volume through the snifter hole in the failed pressure source, the remaining pressure source or the electronic device assigned to it can close the respective other isolating valve.

Advantageously, the electronic device of one of the two pressure sources (according to the example the device B of the second pressure source 2) is also assigned the wheel valves 6a-6d, 7a-7d in addition to the one of the circuit separation valves (62) and the isolating valve (26) of the other pressure source (5). The wheel speed sensors 10a-10d are also assigned to this electronic device (B). This device (B) can now carry out antilock controls virtually unchanged as known and, together with the possibility of building up brake pressure, can carry out all the residual braking functions.

The other electronic device (A) is advantageously assigned the other pair of circuit separation valve (61) and isolating valve (27) and also the ESP sensor system 70 (for example for longitudinal acceleration, lateral acceleration, yaw rate and steering angle). The assigned pressure source 5 is the high-performance pressure regulator, which realizes normal braking in the most comfortable and dynamic manner in the fault-free system. In addition to the pressure build-up, it can now still control the pressure centrally with very high dynamics and accuracy. The circuit separation valve 61 even enables different pressures to be set axle by axle. This occurs by an axle multiplex method. The performance of this control strategy is not at the level of the fault-free system in terms of braking performance; however, it is sufficient to ensure the residual braking functions for the described fault case.

The invention claimed is:
1. A brake system for a motor vehicle with at least four hydraulically actuatable wheel brakes, comprising:
a first electrically controllable pressure source which is separably connected to a first brake circuit supply line via a first isolating valve,
a second electrically controllable pressure source which is separably connected to a second brake circuit supply line via a second isolating valve,
at least four electrically actuatable inlet valves for setting wheel-specific brake pressures, each inlet valve being assigned to one of the wheel brakes, the first brake circuit supply line being connected to two of the inlet valves and the second brake circuit supply line being connected to the two other inlet valves, an electrically actuatable outlet valve per wheel brake for discharging pressure medium from the wheel brake into a pressure medium reservoir, an electrically actuatable circuit separation device, by which the first brake circuit supply line and the second brake circuit supply line are hydraulically separated when the circuit separation device is in an unactuated state, and by which the first brake circuit supply line and the second brake circuit supply line are hydraulically connected to one another when the circuit separation device is in an actuated state, a first electronic device, by which the first pressure source is actuated, and a second electronic device, by which the second pressure source is actuated, the second electronic device being electrically independent of the first electronic device, wherein the first isolating valve is actuated by only the second electronic device, and the second isolating valve is actuated by only the first electronic device.

2. The brake system as claimed in claim 1, wherein the first and the second isolating valve are designed to be normally open.

3. The brake system as claimed in claim 1, wherein the circuit separation device can be actuated both by the first electronic device and by the second electronic device.

4. The brake system as claimed in claim 1, wherein the first pressure source is formed by a first cylinder-piston arrangement with a first hydraulic pressure chamber, the first piston of which is actuated by a first electromechanical actuator, the first pressure chamber in an unactuated state of the first piston being connected via at least one first snifter hole to a first connecting line which is connected to the pressure medium reservoir.

5. The brake system as claimed in claim 1, wherein the second pressure source is formed by a second cylinder-piston arrangement with a second hydraulic pressure chamber, the second piston of which is actuated by an electromechanical second actuator, the second pressure chamber in an unactuated state of the second piston being connected via at least one second snifter hole to a second connecting line which is connected to the pressure medium reservoir.

6. The brake system as claimed in claim 1, wherein all the inlet valves and all the outlet valves are actuated by the same electronic device.

7. The brake system as claimed in claim 6, wherein a wheel speed sensor is provided for each respective wheel assigned to a respective one of the wheel brakes, signals from the wheel speed sensors being supplied to and evaluated by the same electronic device which actuates the inlet and outlet valves.

8. The brake system as claimed in claim 6, wherein a driving dynamics sensor system is provided, signals from which are supplied to and evaluated by the other one of the first and second electronic device other than the one of the first and second electronic device which actuates the inlet and outlet valves.

9. A method for operating a brake system as claimed in claim 1, wherein in the event of a failure of the first pressure source, the first isolating valve is closed by the second electronic device and the second pressure source is actuated to build up a brake pressure.

10. The method as claimed in claim 9, wherein in the event of a failure of the first pressure source, the circuit separation device is actuated by the second electronic device, so that the first brake circuit supply line and the second brake circuit supply line are connected hydraulically to one another.

11. The method as claimed in claim 10, wherein the inlet and outlet valves are actuated by the second electronic device to set wheel-specific brake pressures.

12. The method as claimed in claim 9, wherein in the event of a failure of the second pressure source, the first pressure source and the circuit separation device are actuated by the first electronic device in such a way that axle-specific brake pressures are set at the wheel brakes.

13. The brake system as claimed in claim 2, wherein the circuit separation device can be actuated both by the first electronic device and by the second electronic device.

14. The brake system as claimed in claim 7, wherein a driving dynamics sensor system is provided, signals from which are supplied to and evaluated by the electronic device other than the electronic device which actuates the inlet and outlet valves.

15. The brake system as claimed in claim 1, wherein the pressure medium reservoir is under atmospheric pressure.

16. A brake system for a motor vehicle with at least four hydraulically actuatable wheel brakes, comprising:

a first electrically controllable pressure source which is separably connected to a first brake circuit supply line via a first isolating valve;

a second electrically controllable pressure source which is separably connected to a second brake circuit supply line via a second isolating valve;

at least four electrically actuatable inlet valves for setting wheel-specific brake pressures, each inlet valve being assigned to one of the wheel brakes, the first brake circuit supply line being connected to two of the inlet valves and the second brake circuit supply line being connected to the two other inlet valves;

an electrically actuatable outlet valve per wheel brake for discharging pressure medium from the wheel brake into a pressure medium reservoir;

an electrically actuatable circuit separation device, by which the first brake circuit supply line and the second brake circuit supply line are hydraulically separated when the circuit separation device is in an unactuated state, and by which the first brake circuit supply line and the second brake circuit supply line are hydraulically connected to one another when the circuit separation device is in an actuated state;

a first electronic device, by which the first pressure source is actuated; and a second electronic device, by which the second pressure source is actuated, the second electronic device being electrically independent of the first electronic device, wherein the first isolating valve is actuated by the second electronic device, and the second isolating valve is actuated by the first electronic device, wherein the circuit separation device comprises a first electrically actuatable circuit separation valve, which is designed to be normally closed, and a second electrically actuatable circuit separation valve, which is designed to be normally closed, the two circuit separation valves being connected in parallel with one another.

17. The brake system as claimed in claim 16, wherein the first circuit separation valve is actuated by the first electronic device, and the second circuit separation valve is actuated by the second electronic device.

18. A brake system for a motor vehicle with at least four hydraulically actuatable wheel brakes, comprising:

a first electrically controllable pressure source which is separably connected to a first brake circuit supply line via a first isolating valve;

a second electrically controllable pressure source which is separably connected to a second brake circuit supply line via a second isolating valve;

at least four electrically actuatable inlet valves for setting wheel-specific brake pressures, each inlet valve being assigned to one of the wheel brakes, the first brake circuit supply line being connected to two of the inlet valves and the second brake circuit supply line being connected to the two other inlet valves;

an electrically actuatable outlet valve per wheel brake for discharging pressure medium from the wheel brake into a pressure medium reservoir;

an electrically actuatable circuit separation device, by which the first brake circuit supply line and the second brake circuit supply line are hydraulically separated when the circuit separation device is in an unactuated state, and by which the first brake circuit supply line and the second brake circuit supply line are hydraulically connected to one another when the circuit separation device is in an actuated state;

a first electronic device, by which the first pressure source is actuated; and a second electronic device, by which the second pressure source is actuated, the second electronic device being electrically independent of the first electronic device, wherein the first isolating valve is actuated by the second electronic device, and the second isolating valve is actuated by the first electronic device, wherein a simulation device for generating a brake pedal feel is provided, which is coupled to a brake pedal, and no mechanical and/or hydraulic operative connection between the brake pedal and the wheel brakes is provided.

* * * * *